(12) United States Patent
Kotsiopoulos (10) Patent No.: US 9,528,660 B2
(45) Date of Patent: Dec. 27, 2016

(54) SYSTEM FOR SUPERCRITICAL FLUID EXTRACTION

(71) Applicant: Thomas Kotsiopoulos, Sierra vista, AZ (US)

(72) Inventor: Thomas Kotsiopoulos, Sierra vista, AZ (US)

( * ) Notice: Subject to any disclaimer, the term of this patent is extended or adjusted under 35 U.S.C. 154(b) by 456 days.

(21) Appl. No.: 14/096,607

(22) Filed: Dec. 4, 2013

(65) Prior Publication Data

US 2014/0090728 A1   Apr. 3, 2014

Related U.S. Application Data

(63) Continuation-in-part of application No. 13/324,487, filed on Dec. 13, 2011, now Pat. No. 9,103,334.

(Continued)

(51) Int. Cl.
*B01D 11/04* (2006.01)
*C11B 1/10* (2006.01)
(Continued)

(52) U.S. Cl.
CPC ............ *F17D 1/08* (2013.01); *B01D 11/0403* (2013.01); *C11B 1/104* (2013.01); *F04B 15/06* (2013.01);
(Continued)

(58) Field of Classification Search
CPC .......... F04B 15/06; F04B 15/08; F04B 35/04; F04B 11/0075; F04B 2015/0818; F04B 39/005; F04B 39/12; F04B 39/123; F04B 35/01; F04B 35/008; Y10T 137/8376; F17D 1/08; B01D 11/02; B01D 11/0203; B01D 11/04; B01D 11/0403; B01D 11/0407; B01D 11/0411; B01D 15/14; B01D 15/04; B01L 2400/0478; C11B 1/10; C11B 1/104
(Continued)

(56) References Cited

U.S. PATENT DOCUMENTS

| 3,266,383 A | 8/1966 | Cairns | |
| 3,723,066 A * | 3/1973 | Moran | G01N 35/021 141/130 |
| 4,752,385 A * | 6/1988 | Wilson | G01N 30/32 210/101 |
| 4,808,092 A * | 2/1989 | Funke | F04B 13/00 417/454 |

(Continued)

OTHER PUBLICATIONS

United States Patent and Trademark Office, International Search Report in International Patent Application No. PCT/US2014/067865 (Mar. 16, 2015).

*Primary Examiner* — Joseph Drodge
(74) *Attorney, Agent, or Firm* — Leydig, Voit & Mayer, Ltd.

(57) ABSTRACT

A supercritical fluid extraction system including a housing, motor, linkage assembly, and carriage coupled to the linkage. A piston assembly includes a piston housing with a chamber, back check valve, and piston coupled to the carriage and movable within the piston housing. The piston assembly includes a fluid inlet fluidly communicating with the chamber, and receives, compresses, and expels fluid into an exit fluid line. An intake manifold receives fluid and provides an inlet pathway to the fluid inlet. A single-pass flow path fluidly connects the exit fluid line and a collection chamber, extending through the exit fluid line, a compression chamber, a flow modulator assembly, and the collection chamber. The fluid extracts liquid from solid material within the compression chamber when at a minimum pressure within the compression chamber, passes through the flow modulator assembly and precipitates the extracted liquid into the collection chamber when below the minimum pressure.

14 Claims, 7 Drawing Sheets

Related U.S. Application Data (60) Provisional application No. 61/441,909, filed on Feb. 11, 2011.

(51) Int. Cl.

| | | |
|---|---|---|
| *F04B 15/08* | (2006.01) | |
| *F04B 35/01* | (2006.01) | |
| *F04B 39/12* | (2006.01) | |
| *F17D 1/08* | (2006.01) | |
| *F04B 35/00* | (2006.01) | |
| *F04B 35/04* | (2006.01) | |
| *F04B 15/06* | (2006.01) | |

(52) U.S. Cl.
CPC ............ *F04B 15/08* (2013.01); *F04B 35/008* (2013.01); *F04B 35/04* (2013.01); *F04B 2015/0818* (2013.01); *Y10T 137/8376* (2015.04)

(58) Field of Classification Search
USPC ...... 92/73, 140, 163, 170.1; 210/198.2, 511, 210/634, 656; 417/32, 53, 313, 419, 62, 415
See application file for complete search history.

(56) References Cited

U.S. PATENT DOCUMENTS

| | | | | |
|---|---|---|---|---|
| 4,990,250 | A | * | 2/1991 | Hellinger ............... G01N 30/32 210/101 |
| 5,151,015 | A | | 9/1992 | Bauer et al. |
| 5,260,028 | A | * | 11/1993 | Astle ...................... G01N 1/405 210/635 |
| 5,630,706 | A | * | 5/1997 | Yang ................... B01F 13/0827 210/198.2 |
| 5,750,029 | A | * | 5/1998 | Houck ............... B01D 11/0203 210/137 |
| 7,837,447 | B2 | | 11/2010 | Mao et al. |
| 8,414,535 | B2 | | 4/2013 | Jacobsen et al. |
| 2003/0215341 | A1 | * | 11/2003 | Maiefski ................ F04B 9/042 417/313 |
| 2004/0065353 | A1 | | 4/2004 | Tunnicliffe et al. |
| 2007/0264175 | A1 | * | 11/2007 | Iversen .............. B01D 11/0203 422/235 |
| 2008/0145251 | A1 | * | 6/2008 | Haertl ................. F04B 11/0083 417/545 |
| 2010/0040483 | A1 | * | 2/2010 | Berger ................ F04B 11/0075 417/205 |
| 2010/0151098 | A1 | * | 6/2010 | Catchpole ............ A23L 1/3002 426/425 |
| 2011/0049031 | A1 | * | 3/2011 | Cappiello ............. G01N 30/32 210/198.2 |
| 2012/0207629 | A1 | | 8/2012 | Kotsiopoulos |

* cited by examiner

SYSTEM FOR SUPERCRITICAL FLUID EXTRACTION

CROSS-REFERENCE TO RELATED APPLICATIONS

This patent application is a continuation-in-part of U.S. patent application Ser. No. 13/324,487 filed Dec. 13, 2011, which claims the benefit of U.S. Patent Application No. 61/441,909 filed Feb. 11, 2011.

BACKGROUND

Supercritical fluid extraction (SFE) is the process of using supercritical fluids as an extracting solvent for separating components from an extraction matrix. In many cases, the process is used to separate liquids from a solid matrix, but SFE can be used to extract components from liquid matrices as well. SFE can be used to remove unwanted material from a product, to collect a desired product from the solid matrix, to prepare samples for analytical purposes, and for other uses. One typical use for SFE is for extracting essential oils and/or other herbal distillates from plants and other organic matter.

In its supercritical state, a fluid exhibits both gas-like and liquid-like characteristics. The gaseous properties of the supercritical fluid help to penetrate a solid matrix, while the liquid properties of the supercritical fluid allow the fluid to act as a solvent, pulling oils, resins, or other substances out of the solid matrix. Each particular fluid has a specific range of temperature and pressure combinations that cause the fluid to become supercritical. Carbon dioxide ($CO_2$), for example, is a commonly used fluid in SFE because of the relatively low temperature and pressures at which it exhibits supercritical fluid properties. High temperatures and pressures can alter the molecular composition of some solid matrices, so keeping temperatures and pressures relatively low in the SFE process helps benefit the extraction process.

Known systems for performing SFE are typically large, expensive, and, often, unreliable and prone to failures. These and other issues are addressed as described herein.

SUMMARY

The disclosure describes, in one aspect, a supercritical fluid extraction system. The supercritical fluid extraction system includes a housing, a motor mounted to the housing, a linkage assembly disposed within the housing and moveable by the motor, and a carriage coupled to the linkage assembly such that the carriage moves when the motor moves the linkage assembly. The supercritical fluid extraction system also includes a piston assembly disposed within the housing. The piston assembly includes a piston housing having a first end and a second end, a chamber formed within the piston housing between the first end and the second end, a back check valve disposed at the first end, and a piston coupled to the carriage and movably disposed partially within the second end of the piston housing. The piston is adapted to move within the chamber alternatively toward and away from the back check valve when the carriage moves. The piston assembly also includes a fluid inlet formed in the piston housing. The fluid inlet is disposed such that movement of the piston within the chamber selectively opens and closes fluid communication between the fluid inlet and the chamber. The piston assembly is adapted to receive a fluid at a relatively low pressure through the fluid inlet, compress the fluid within the chamber with the piston, and expel the fluid through the back check valve at a relatively high pressure into an exit fluid line. The supercritical extraction system also includes an intake manifold mounted to the housing. The intake manifold is adapted to receive fluid through an input orifice and to provide an inlet pathway between the input orifice and the fluid inlet of the piston assembly. The supercritical extraction system also includes a compression chamber mounted to the housing, a flow modulator assembly, and a collection chamber. The compression chamber is adapted to contain solid material for liquid extraction, wherein the compression chamber is in fluid communication with the exit fluid line such that the relatively high-pressure fluid expelled from the piston assembly enters the compression chamber. The collection chamber is in selective fluid communication with the compression chamber, and the flow modulator assembly is adapted to open and close to selectively provide fluid communication between the compression chamber and the collection chamber. The fluid within the collection chamber extracts liquid from the solid material when the pressure of fluid reaches a minimum pressure, and the fluid precipitates the extracted liquid into the collection chamber when the pressure of the fluid drops below the minimum pressure within the collection chamber. A single-pass flow path for high-pressure fluid fluidly connects the exit fluid line and the collection chamber. The single-pass flow path extends from the exit fluid line, through the compression chamber, through the flow modulator assembly, and into the collection chamber.

In another embodiment, the disclosure describes a method of operating a supercritical fluid extraction system. The method comprises introducing fluid into an input orifice at a relatively low pressure, splitting the fluid into a first fluid stream and a second fluid stream, and directing the first fluid stream into a first piston assembly and directing the second fluid stream into a second piston assembly. The method also includes compressing the first fluid stream in the first piston assembly and compressing the second fluid stream in the second piston assembly to a relatively high pressure that is higher than the relatively low pressure, and combining the compressed first fluid stream with the compressed second fluid stream to form a high-pressure fluid stream in an exit fluid line. The method includes mixing the high-pressure fluid stream with a solid material within a compression chamber, measuring the pressure of the high-pressure fluid stream within the compression chamber, and opening a flow modulator to allow the high-pressure fluid stream to flow out of the compression chamber and into a collection chamber when the pressure within the compression chamber exceeds a minimum pressure. The method also includes collecting liquid extracted from the solid material in the collection chamber by exposing the high-pressure fluid to a pressure below the minimum pressure within the collection chamber. A single-pass flow path for the high-pressure fluid stream extends from the exit fluid line, through the compression chamber, through the flow modulator, and into the collection chamber.

In yet another embodiment, the disclosure describes a supercritical fluid extraction system comprising a housing, a motor mounted to the housing, and a linkage assembly disposed within the housing and moveable by the motor. A carriage is coupled to the linkage assembly such that the carriage moves when the motor moves the linkage assembly. A first piston assembly and a second piston assembly is disposed within the housing. The first piston assembly is adapted to receive fluid through a first fluid inlet at a relatively low pressure, compress fluid within the first piston assembly, and expel fluid at a relatively high pressure into a first exit fluid line. The second piston is adapted to receive fluid through a second fluid inlet at a relatively low pressure, compress fluid within the second piston assembly, and expel fluid at a relatively high pressure into a second exit fluid line. The supercritical extraction system also comprises an intake manifold mounted to the housing. The intake manifold comprises an input orifice adapted to receive fluid, a first inlet pathway formed in the intake manifold that provides a fluid connection between the input orifice and the first fluid inlet of the first piston assembly and a fluid connection between the input orifice and an inlet transfer line, and a second inlet pathway formed in the intake manifold that provides a fluid connection between the inlet transfer line and the second fluid inlet of the second piston assembly. The supercritical extraction system also includes a compression chamber mounted to the housing, a collection chamber, and a flow modulator assembly. The compression chamber is adapted to contain solid material for liquid extraction, wherein the compression chamber is in fluid communication with both the first and second exit fluid lines such that the fluid expelled from the first and second piston assemblies enters the compression chamber. The collection chamber is in selective fluid communication with the compression chamber, and the flow modulator assembly is adapted to open and close to selectively provide fluid communication between the compression chamber and the collection chamber. The fluid within the collection chamber extracts liquid from the solid material when the pressure of the fluid reaches a minimum pressure, and the fluid precipitates the extracted liquid into the collection chamber when the pressure of the fluid drops below the minimum pressure within the collection chamber. A single-pass flow path for high pressure fluid is defined and extends from the first and second exit fluid lines, through the compression chamber, through the flow modulator assembly, and into the collection chamber.

BRIEF DESCRIPTION OF THE DRAWINGS

In one disclosed embodiment, a self-contained structure for performing SFE operations is disclosed. In the described embodiment, high pressure fluid, such as $CO_2$, is pumped into an extraction vessel that contains a solid matrix, such as plant material. Once extraction occurs, the supercritical solvent passes into a collection vessel at a lower temperature and pressure combination than will result in loss of supercritical behavior. In the collection vessel, the extracted material precipitates out of the solvent for collection, and the solvent is dissipated into the atmosphere.

In the description that follows, reference is made to the accompanying drawings, of which

DETAILED DESCRIPTION

Figure 1:
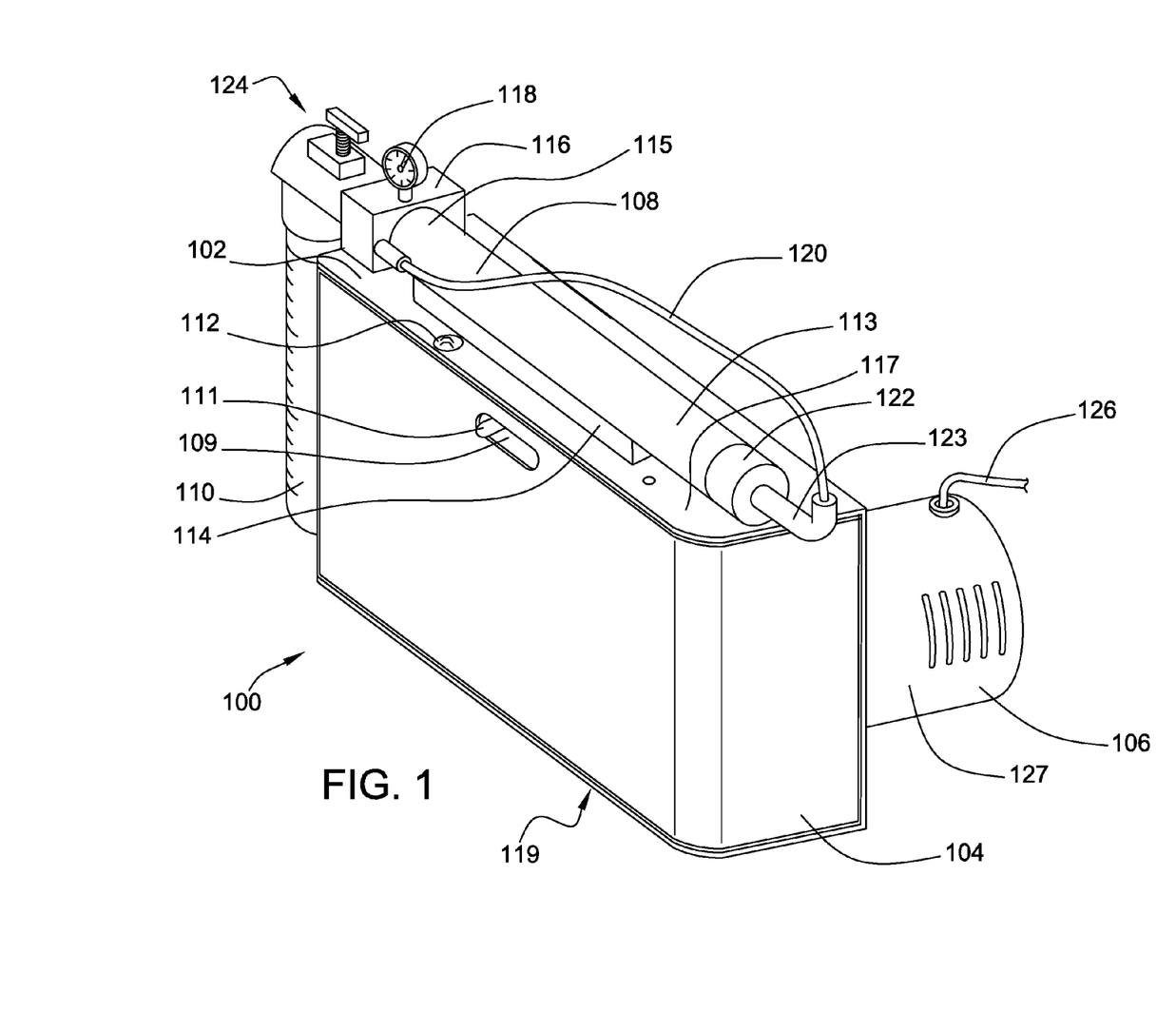
FIG. 1 is a perspective view of a portable supercritical fluid extraction system in accordance with the present disclosure.

This disclosure relates to a portable supercritical fluid extraction (SFE) system used for extracting liquids from solid products such as plant material. Referring to the figures, FIG. 1 illustrates an embodiment of a portable SFE system 100 having a housing 102, a cover 104, a motor 106, a compression chamber 108, and a collection chamber 110. The housing 102 provides a portion of the external structure of the portable SFE system 100 for enclosing the interior components. The housing 102 also provides a support structure for mounting internal components of the SFE system 100. The housing 102 includes one or more apertures 109 providing access to interior components of the system and/or permitting one or more components to extend from the interior to the exterior of the SFE system 100. For example, an on/off switch 111 may extend from the housing 102. An input orifice 112 is formed in the housing 102 to receive a suitable fluid delivery mechanism. It will be appreciated that the housing 102 can include any suitable number of apertures for any suitable number of purposes.

The compression chamber 108 is mounted above the housing 102 and has an input end 113 and a collection end 115. In the illustrated embodiment, the compression chamber 108 is mounted atop a heating block 114, which optionally contains heating elements and temperature sensing elements, such as thermocouples (not shown). The collection end 115 of the compression chamber 108 engages a flow modulator assembly 124. The flow modulator assembly 124 extends through an orifice formed in a compression manifold 116, which is mounted to the housing 102. In the illustrated embodiment, a pressure gauge 118 that measures and displays the pressure within the compression chamber 108 extends from the compression manifold 116. Although the pressure gauge 118 is shown mounted to the compression manifold, other locations can be used. For example, the pressure gauge 118 can mount to the compression chamber 108 itself or at other suitable locations from which a fluid pressure within the compression chamber 108 can be monitored directly or indirectly. A high pressure hose 120 is also connected to the compression manifold 116 at a manifold end 121, and to an end fitting 122 at a fitting end 123. In some embodiments, the end fitting 122 is threaded to mate securely with the input end 113 of the compression chamber 108, though it is contemplated that other connection methods can be used. The end fitting 122 is removably engaged with the high pressure hose 120, and adapted to allow a fluid connection between the high pressure hose and the compression chamber 108.

The cover 104 is removable from the housing 102 to provide access to the interior components of the portable SFE system 100, which are generally disposed between an upper housing plate 117 and a lower housing plate 119. The cover 102 also protects the interior components of the housing 102 when the cover 104 is disposed on the housing. The motor 106 is mounted to a location on the housing 102, such as the rear of the housing, and may be removable for servicing, replacement, and the like. As shown, the motor 106 is an electric motor, and accordingly, includes a power cord 126. It is contemplated, however, that any suitable motor could be used, such as a hydraulic actuator or a combustion engine.

Figure 2:
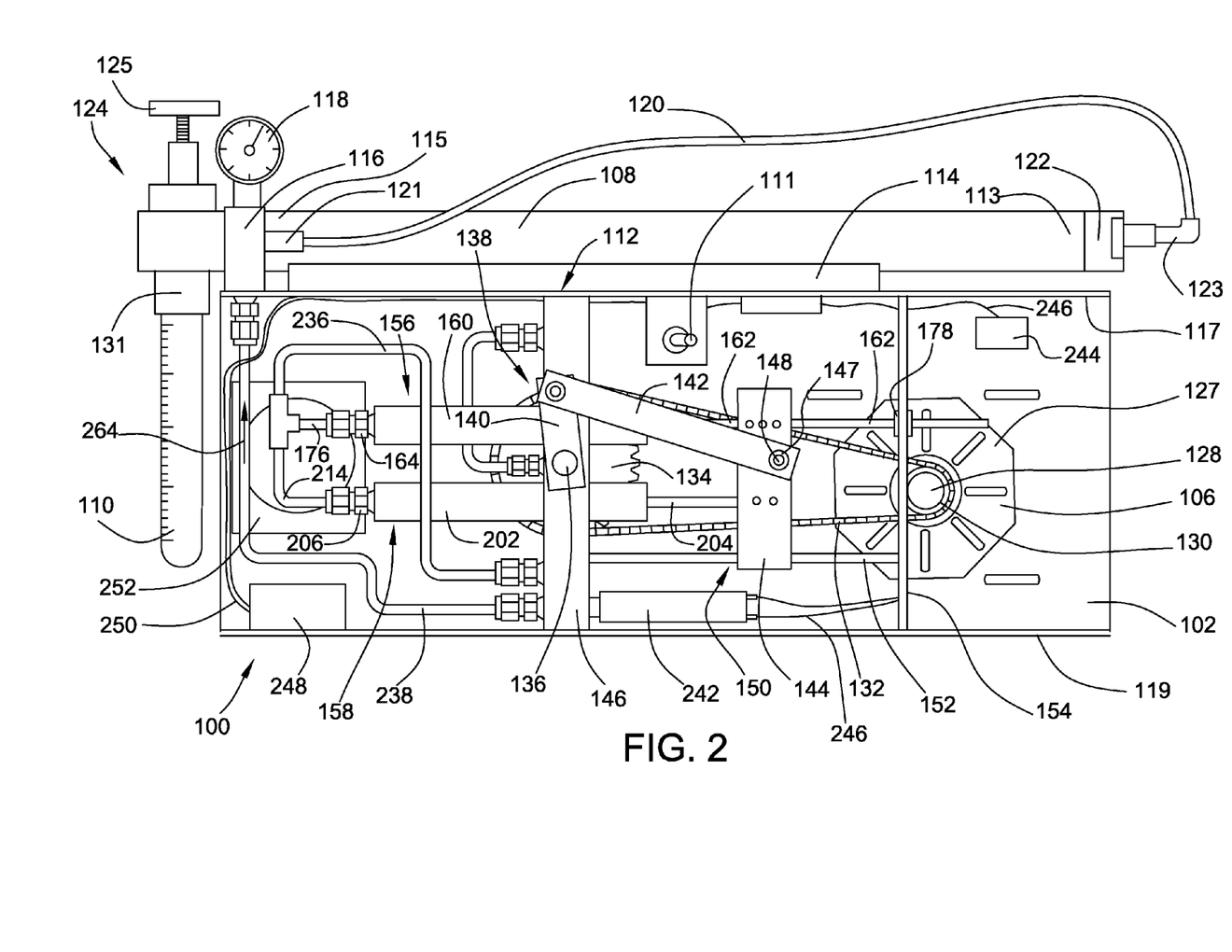
FIG. 2 is a front view of the portable supercritical fluid extraction system of FIG. 1 with the cover removed.

FIG. 2 illustrates the housing 102 with the cover 104 removed to expose the interior components of the portable SFE system 100 for illustration. The motor 106 includes a motor body 127 and a motor shaft 128 extending from the motor body into the housing 102 interior. The motor shaft 128 has a drive gear 130 fixed thereon for transmitting power to driven components. The drive gear 130 is connected via a motor chain 132 to a linkage gear 134. As the motor 106 rotates the motor shaft 128, the drive gear 130 turns the motor chain 132 to rotate the linkage gear 134. It will be appreciated that the motor 106 may drive components of the portable SFE system 100 via any suitable number, type, and size of gears, shafts, and/or linkages.

The linkage gear 134 may be connected to a linkage shaft 136 that extends through an intake manifold 146. The linkage shaft 136 is associated with and operates to rotate a linkage assembly 138 when the motor 106 causes the linkage gear 134 to rotate. The linkage assembly 138, as shown, includes a crank arm 140 and a connecting arm 142, but other structures for transforming rotational to axial motion can be used. The crank arm 140 may be mounted to the linkage shaft 136 near an end thereof such that the crank arm can be rotated by the linkage shaft. The connecting arm 142 is pivotally attached to the crank arm 140 near another end of the crank arm 140. The other end of the connecting arm 142 is pivotally attached to a carriage 144 with a bearing 147 and bolt 148, or other suitable structure. In this way, the carriage 144 is linearly movable as it is pulled and pushed by the connecting arm 142.

A guide bore 150 is formed through the carriage 144 that is adapted to accommodate a guide shaft 152. One end of the guide shaft 152 is anchored to the intake manifold 146, while the opposite end of the guide shaft is anchored to a support beam 154. Opposing ends of the support beam 154 are anchored in the upper housing plate 117 and the lower housing plate 119, and the support beam spans the opening between the two plates. As the carriage 144 is pushed and pulled by the connecting arm 142, the guide shaft 152 remains stationary and the inner surface of the guide bore 150 slides along the guide shaft 152. In this way, the guide shaft 152 helps restrict movement of the carriage 144 in a direction perpendicular to the guide shaft, which may alleviate bending stresses or stresses tending to buckle any of the elongate structures on the linkage assembly 138 when in motion.

Figure 3:
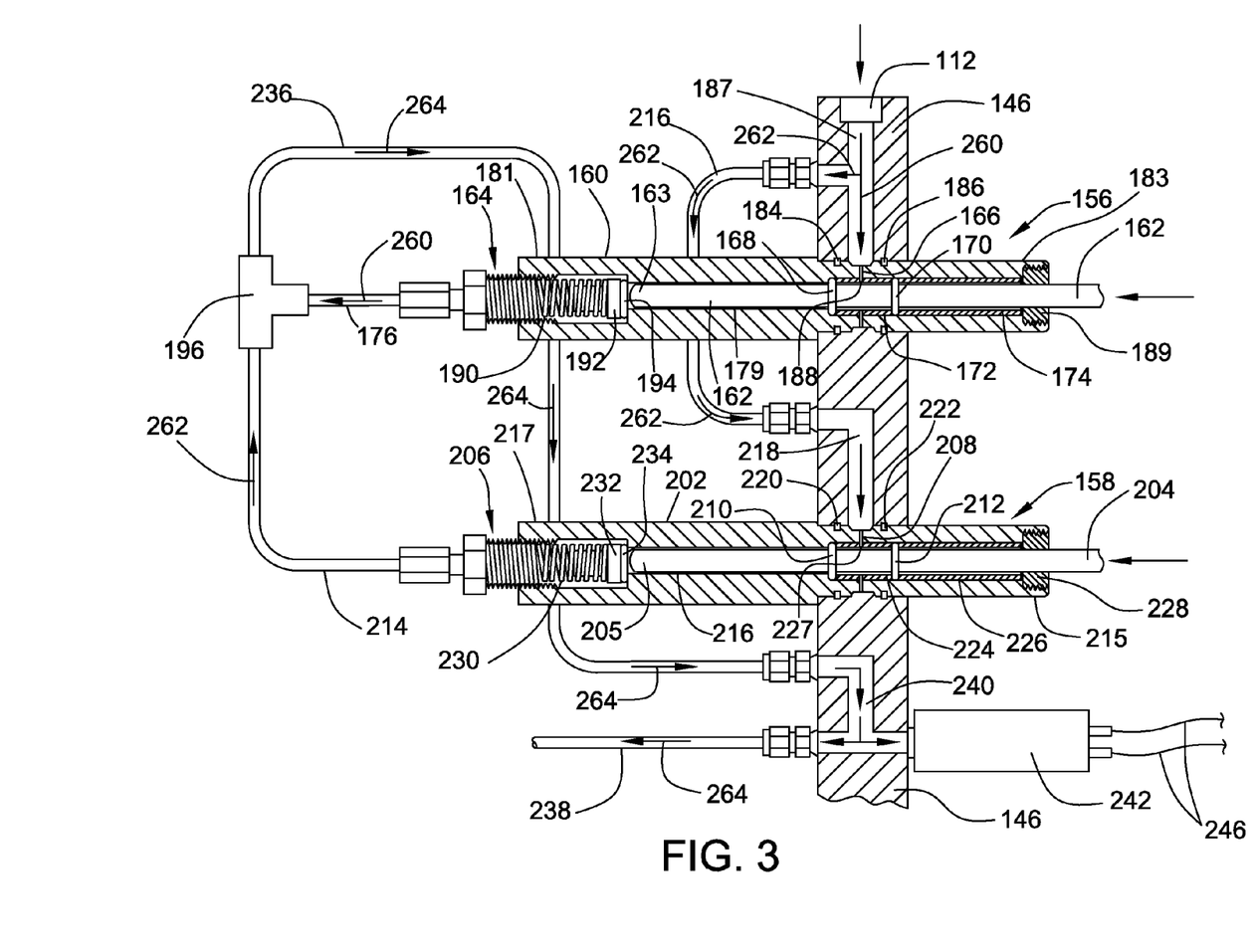
FIG. 3 is a partial sectional view of the portable supercritical fluid extraction system of FIG. 1 with pistons in an extended position.

Referring now to FIGS. 2 and 3, the portable SFE system 100 includes two piston assemblies. In general, a single piston or more than two pistons can be used. Multiple piston assemblies help improve heat dissipation as fluid is compressed within the piston assemblies. In the illustrated embodiment, the portable SFE system 100 includes a first piston assembly 156 and a second piston assembly 158. The first piston assembly 156 includes a cylindrical piston housing 160, a first piston 162, a back check valve 164, a fluid inlet 166, suitable sealing structures such as o-rings 168, 170 on each side of the fluid inlet 166, one or more spacers 172, 174, and a first exit fluid line 176. The first piston 162 is attached to and passes through the carriage 144. The first piston 162 also passes through and is moveably coupled to the support beam 154. The first piston 162 is moveable within a bearing 178 mounted to the support beam 154. The support beam 154 helps maintain linear movement of the carriage 144 in a direction perpendicular to the longitudinal axis of the first piston 162, which alleviates stress on the linkage assembly 138 when in motion. It is contemplated that, in some embodiments, the portion of the first piston 162 that engages the piston housing 160 and the portion of the piston that engages the support beam 154 are formed as separate structures that are connected to one another or, as shown, are formed as a single, integrated structure.

The piston housing 160 further includes a chamber 179 for receiving a portion of the first piston 162 at an end and permitting movement of the piston within the piston housing. The fluid inlet 166 is disposed on the sidewall of the piston housing 160. When the first piston assembly 156 is assembled to the portable SFE system 100, the fluid inlet 166 is disposed within the intake manifold 146. The intake manifold 146 provides an internal pathway for fluid from the input orifice 112 to reach the fluid inlet 166 of the first piston assembly 156. In the illustrated embodiment, a first inlet pathway 187 is formed in the air intake manifold 146 providing fluid communication between the inlet orifice 112 and the fluid inlet 166. Seals 184, 186 are disposed on the outside of the piston housing 160 on each side of the fluid inlet 166 for contacting the interior of the intake manifold 146.

Likewise, the sealing structures, shown as two o-rings 168, 170, are disposed on each side of the fluid inlet 166 within the chamber 179 and are mounted such that they are stationary within the chamber 179. The o-rings 168, 170, are appropriately sized to receive the first piston 162, and are mounted in a stationary position such that the o-rings do not move as the first piston 162 moves through them. The o-rings 168, 170 are maintained in a stationary position using one or more spacers 172, 174, which can be tubular or have any other suitable shape. For example, spacer 172 can be disposed within the chamber 179 between the o-rings 168, 170 to maintain a desired spacing between the o-rings and to help hold the o-rings in a stationary position. As shown, spacer 172 holds o-ring 168 against a ledge in the chamber 179 formed by a change in diameter of the chamber. The spacer 172 includes one or more apertures 188 for allowing fluid into the interior of the spacer. Another spacer 174 is also provided near a second end 183 to help hold the o-rings 168, 170 in a stationary position. As shown, o-ring 170 is held in position between the spacers 172, 174. The first piston 162 is disposed within the spacers 172, 174, and a threaded nut 189 is provided at the second end 183. The threaded nut 189 can be tightened to further secure and retain the o-rings 168, 170 and spacers 172, 174 in position. The threaded nut 189 can also be removed to provide access to the chamber 179 for repair or replacement of parts. It is contemplated that the sealing structures, such as o-rings 168, 170, can be mounted in a stationary position in any suitable manner. Additionally, the sealing structures, such as o-rings 168, 170, can have any suitable shape and may be made of any suitable material.

The back check valve 164 is disposed at the first end 181 of the piston housing 160 and includes a spring 190, a plug 192, and a seal 194 to restrict flow of fluid to a single direction toward the first exit fluid line 176. The seal 194 can be an o-ring, which is mountable to the plug 192 within the piston housing 160. When the valve 164 is closed, the seal 194 abuts a ledge formed by a change in diameter of the chamber 179. The spring 190 biases the plug 192 and seal 194 against the ledge. The valve 164 opens by moving away from the ledge when a particular pressure that induces a force overcoming the closing force of the spring 190 onto the plug 192 is reached in the chamber 179. When this occurs, fluid is permitted to flow through a space between the plug 192 and the chamber 179 and expel into the first exit fluid line 176. The first exit fluid line 176 is attached to a first end 181 of the piston housing 160 and feeds into an exit line junction 196.

The portable SFE system 100 further includes a second piston assembly 158 that is connected in parallel to and is similar to the first piston assembly 156. Thus, the second piston assembly 158 include a cylindrical piston housing 202, a second piston 204, a back check valve 206, a fluid inlet 208, suitable sealing structures such as o-rings 210, 212 on each side of the fluid inlet 208, and a second exit fluid line 214. The second piston 204 is also attached to the carriage 144. The piston housing 202 includes a chamber 216 for receiving a portion of the second piston 204 at an end 215 and permitting movement of the second piston 204 within the piston housing 216. The fluid inlet 208 is also disposed on the sidewall of the piston housing 202. When the second piston assembly 158 is assembled to the portable SFE system 100, the fluid inlet 208 is disposed within or at least in fluid communication with the intake manifold 146. A fluid pathway is thus provided between the inlet orifice 112 and the fluid inlet 208 of the second piston assembly 158. In the illustrated embodiment, the fluid pathway from the inlet orifice 112 to the fluid inlet 208 includes the first inlet pathway 187 formed in the intake manifold 146, an inlet transfer line 216, and a second inlet pathway 218. Seals 220, 222 are disposed on the outside of the piston housing 202 on each side of the fluid inlet 208 for contacting the interior of the intake manifold 146.

Likewise, the sealing structures, shown as two o-rings 210, 212, are disposed on each side of the fluid inlet 208 within the chamber 216. The o-rings 210, 212 are sized to receive the second piston 204, and are mounted in a stationary position such that they do not move as the second piston 204 moves through the o-rings. The o-rings 210, 212 are maintained in a stationary position using one or more spacers 224, 226, which can be tubular or any other suitable shape. For example, spacer 224 can be disposed within the chamber 216 between the o-rings 210, 212 to maintain a desired spacing between the o-rings and to help hold the o-rings in a stationary position. As shown, spacer 224 holds o-ring 210 against a ledge in the chamber 216 formed by a change in diameter of the chamber. The spacer 224 includes or forms one or more apertures 227 for allowing fluid into the interior of the spacer 224. Another spacer 226 is also provided near the end 215 to help hold the o-rings 210, 212 in a stationary position. As shown, o-ring 212 is held in position between the spacers 224, 226. The second piston 204 is disposed within the spacers 224, 226, and a threaded nut 228 is provided at the end 215. The threaded nut 228 can be tightened to further secure and retain the o-rings 210, 212 and spacers 224, 226 in position. The threaded nut 228 can also be removed to provide access to the chamber 216 for repair or replacement of parts. It will be appreciated that the sealing structures, such as o-rings 210, 212, can be mounted in a stationary position in any suitable manner. Additionally, the sealing structures, such as o-rings 210, 212, can have any suitable shape and can be made of any suitable material.

The back check valve 206 is disposed at the first end 217 of the piston housing 202 and includes a spring 230, a plug 232, and a seal 234 to restrict the flow of fluid to a single direction toward the second exit fluid line 214. The seal 234 is embodied as an o-ring, which is mounted to the plug 232 within the piston housing 202, but other types of seals such as u-cup seals, lip seals and other suitable seal designs may be used. When the back check valve 206 is closed, the seal 234 abuts a ledge formed by a step in a bore of the chamber 216. The spring 230 biases the plug 232 and seal 234 against the ledge such that the valve 206 can open by moving away from the ledge when a particular pressure is reached in the chamber 216. When this occurs, fluid is permitted to flow through a space between the plug 232 and the chamber 216 and then expel into the second exit fluid line 214. As shown, the second exit fluid line 214 is attached to an end 217 of the piston housing 202 and is fluidly connected to the exit line junction 196. The exit line junction 196 receives fluid traveling from the first piston assembly 156 via the first exit fluid line 176 and fluid from the second piston assembly 158 via the second exit fluid line 214. A combined exit fluid line 236 is fluidly connected between the exit line junction 196 and the intake manifold 146 to provide an internal pathway for fluid to reach a fluid output line 238. In the illustrated embodiment, an output pathway 240 is formed in the intake manifold 146 to provide fluid communication between the combined exit fluid line 236 and the fluid output line 238.

The output pathway 240 that is formed within the intake manifold 146 also provides fluid communication between the combined fluid exit line 236 and a pressure regulator 242. The pressure regulator 242 includes a pressure sensor that is arranged and configured to monitor fluid pressure within the output pathway 240 and the combined fluid exit line 236. In the embodiment illustrated in FIG. 2, the pressure regulator 242 is in electronic communication with a switch 244 via electrical wires 246. In some embodiments, the switch 244 can be a solenoid switch, but other types of suitable switches are contemplated. The pressure regulator 242 is adapted to transmit a pressure signal to the switch 244 when the pressure in the outlet pathway 240 exceeds a predetermined pressure. In certain embodiments, the predetermined pressure can be about 3,000 psi, but other predetermined pressures are contemplated. The switch 244 further electronically communicates with the motor 106. When the switch 244 receives the pressure signal, the switch moves from an open position to a closed position. When the switch 244 moves to the closed position, power to the motor 106 is interrupted to stop the motor, which in turn stops fluid compression within the system 100 and helps maintain system fluid pressure below a maximum allowable pressure. It is contemplated that, in some embodiments, a controller can be programmed receive signals from the pressure regulator. In such embodiments, the controller may control the operation of the motor 106 based on inputs from the pressure regulator or other input devices. It is also contemplated that, in certain embodiments, the pressure regulator may include its own controller that communicates directly with the motor.

Referring again to FIG. 2, once activated by manually moving the on/off switch 111 or by instruction from the switch 244, the motor 106 begins to rotate the motor shaft 128 and the drive gear 130, which turns the linkage gear 134 and linkage shaft 136 via the motor chain 132. The rotation of the linkage shaft 136 rotates the crank arm 140 a full rotation, or 360°, about the linkage shaft. As the crank arm 140 rotates, it pulls and pushes the carriage 144 via the connecting arm 142. As the carriage 144 moves toward and away from the intake manifold 146, its movement is maintained in a generally linear direction by the guide shaft 152 fitted within the guide bore 150 of the carriage. Both pistons 162, 204 are connected to the carriage 144 and move in a coordinated fashion. In some embodiments, the pistons 162, 204 move in sync with one another, while in other embodiments, the pistons can move with a phase difference to reduce and spread out the load on the motor 106. Both pistons 162, 204 move in a generally linear direction when the carriage moves in a generally linear direction.

Figure 4:
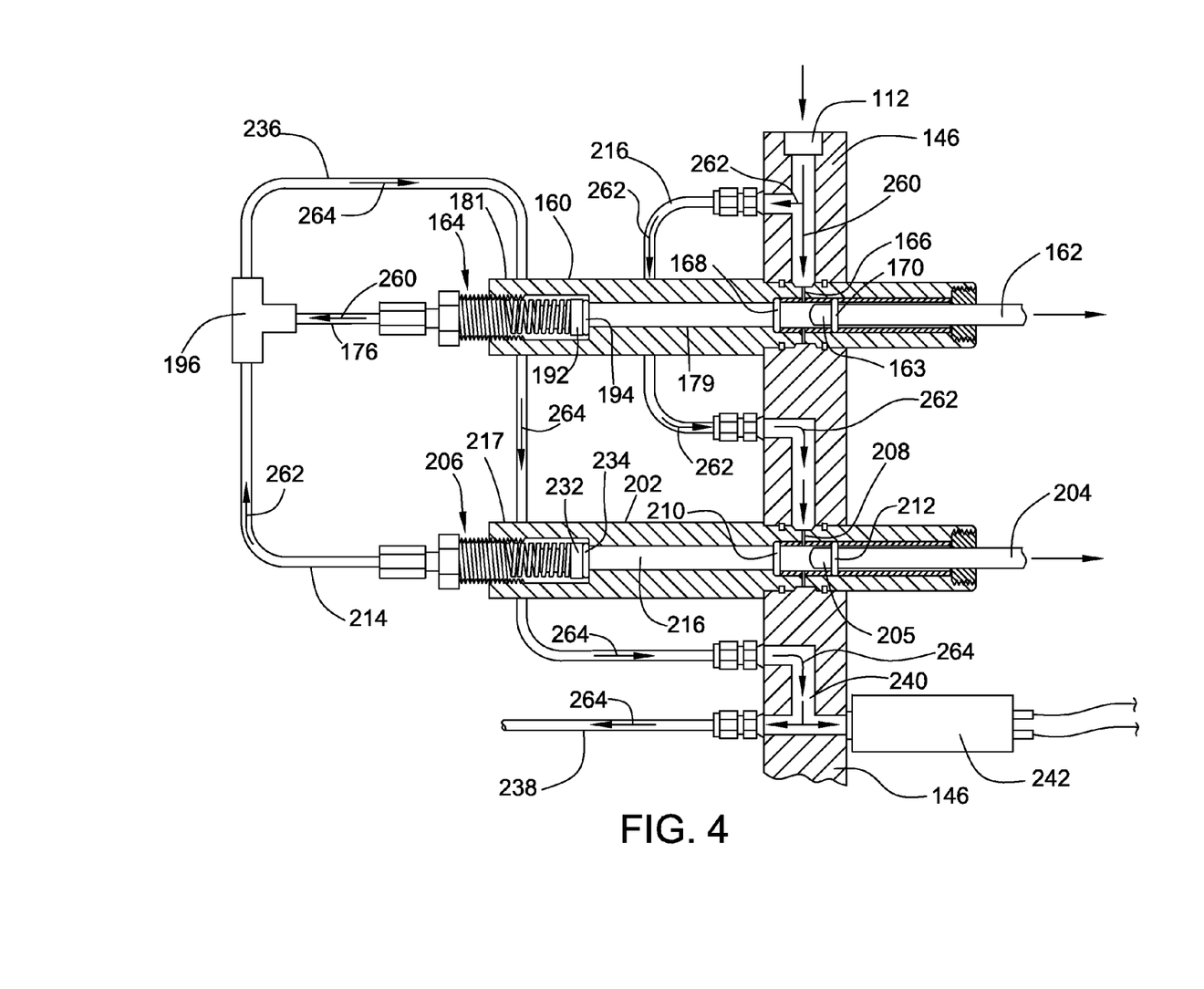
FIG. 4 is a partial sectional view of the portable supercritical fluid extraction system of FIG. 1 with pistons in a retracted position.

As the carriage 144 moves, it moves the first and second pistons 162, 204 both toward the back check valves 164, 206, as shown in FIG. 3, and away from the back check valves 164, 206, as shown in FIG. 4. As the first and second pistons 162, 204 moves, the o-rings 168, 170, 210, 212 on each side of the fluid inlets 166, 208 remain stationary. As shown in FIG. 4, when the pistons 162, 204 are pulled to the furthest extent away from the back check valves 164, 206, ends 163, 205 of the pistons are disposed between the respective two o-rings 168, 170, 210, 212 in each chamber 179, 216. This permits fluid from the respective fluid inlets 166, 208 to enter the chambers 179, 216. The carriage 144 then pushes the pistons 162, 204 toward the back check valves 164, 206, as shown in FIG. 3, such that the pistons pass through the o-rings 168, 210 positioned closer to the back check valves 164, 206. When this occurs, the respective fluid inlets 166, 208 are cut off from portions of the chambers 179, 216 by the seal formed between the o-rings 168, 210 and the pistons 162, 204. As the pistons 162, 204 continue to move toward the back check valves 164, 206, fluid in the chambers 179, 216 is compressed and sent past the respective back check valves 164, 206 when sufficient pressure has been accumulated.

As the pistons 162, 204 move away from the back check valves 164, 206 with the subsequent stroke, the o-rings 168, 210 closer to the back check valves block fluid flow past the o-rings while each piston is encircled by the o-rings. A vacuum is formed within the chambers 179, 216 when the pistons are retracted, which creates a vacuum force against the o-rings 168, 210. The vacuum force helps counterbalance the friction force asserted against the o-rings 168, 210 by the moving pistons 162, 204. The counteracting vacuum and friction forces help reduce the amount of wear experienced by the o-rings 168, 210. The motor 106 continues to drive the pistons 162, 204 until the on/off switch 111 is turned off, or the switch 244 instructs the motor to turn off, as discussed above.

Referring again to FIG. 2, the output fluid line 238 provides a fluid connection between the output pathway 240 formed in the intake manifold 146 and an interior pathway formed in the compression manifold 116. The interior pathway in the compression manifold 116 provides a fluid pathway between the output fluid line 238 and the high pressure hose 120, which feeds into the end fitting 122. Thus, fluid communication is established from the first and second exit fluid lines 176, 214, through the combined exit fluid line 236, through the output pathway 240 in the intake manifold 146, through the output fluid line 238, through the high pressure hose 120, and into the compression chamber 108. The flow then enters a collection chamber as described below. It is noted that, in this embodiment, a single-pass flow path for high-pressure fluid fluidly connects the exit fluid line and the collection chamber. The single-pass flow path extends from the exit fluid line, through the compression chamber, through the flow modulator assembly, and into the collection chamber. The pressure gauge 118 is adapted to measure and display the fluid pressure within the compression chamber 108.

Figure 5:
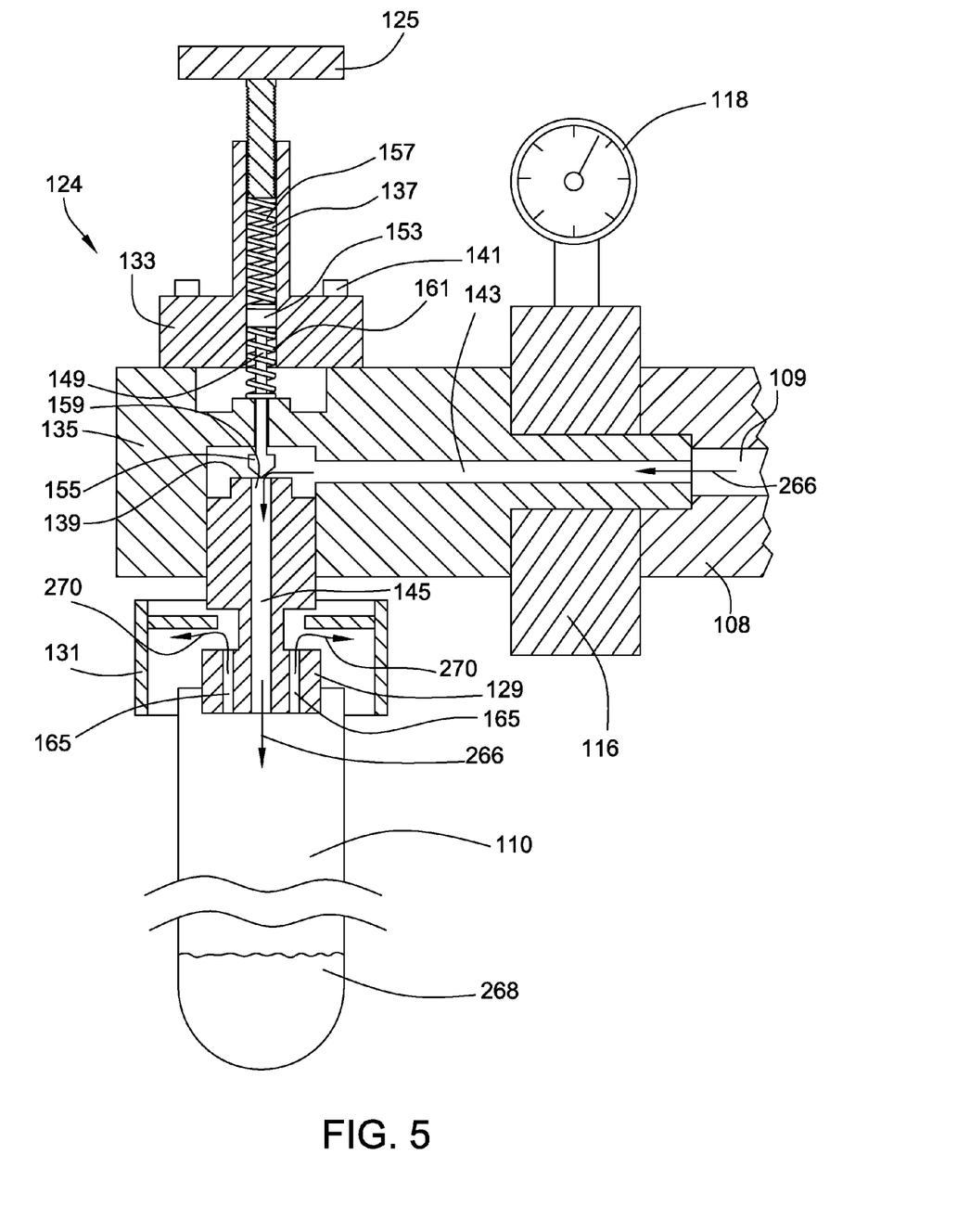
FIG. 5 is a partial sectional view of a flow modulator assembly of the portable supercritical fluid extraction system of FIG. 1.

The flow modulator assembly 124, which meters fluid flow along the single-pass flow path, allows the selective flow of compressed fluid from the compression chamber 108 into the collection chamber 110, where it can be used for a SFE process. As illustrated in FIG. 5, the flow modulator assembly 124 selectively opens and closes a fluid pathway between an interior chamber 109 within compression chamber 108 and the collection chamber 110. The flow modulator assembly 124 includes a handle 125, a handle housing 133, flow modulator manifold 135, and a fluid exchange valve 129. The handle 125 is threaded into or otherwise releasably connected with the handle housing 133 within a handle bore 137 formed within the handle housing. The handle housing 133 is mounted to the flow modulator manifold 135 with bolts 141, or other suitable fasteners. While shown as separate components, it is contemplated that the handle housing 133 and the flow modulator manifold 135 can be formed as a single, integrated structure. The flow modulator manifold 135 passes through the mounting block 116 and engages an outlet opening of the compression chamber 108. A modulator pathway 143 is formed in the flow modulator manifold and is in fluid communication with the interior chamber 109 of the compression chamber 108. The fluid exchange valve 129 is mounted to the fluid modulator manifold 135 to place an exit pathway 145 in selective fluid communication with the modulator pathway 143 and the collection chamber 110. The fluid exchange valve 129 can have a valve seat 139 that forms an opening 159 in the fluid exchange valve 129 in fluid communication with the exit pathway 145. A plunger 149 is disposed in a modulator bore 151 of the flow modulator manifold 135. The plunger 149 is reciprocable within the bore 151 and configured to act as a valve. As shown, a spring end 153 of the plunger is disposed within the handle bore, and a sealing end 155 of the plunger is disposed in the modulator pathway 143. A compression spring 157 is disposed within the handle bore 137 between the handle 125 and the spring end 153 of the plunger 155. An expansion spring 161 is disposed between the spring end 153 of the plunger 149 and the fluid modulator manifold 135, biasing the spring end of the plunger away from the fluid modulator manifold. The sealing end 155 of the plunger 149 is adapted to selectively engage with the valve seat 139 over the opening 159 to close the fluid pathway between the modulator pathway 143 in the fluid modulator manifold 135 and the exit pathway 145 in the fluid exchange valve 129.

When the handle 125 is rotated in a first direction, the handle moves downward and presses the compression spring 157 against the spring end 153 of the plunger 149, causing the sealing end 155 of the plunger to cover the entrance to the exit pathway 145. When the handle 125 is rotated in a second direction, the handle moves upward allowing the expansion spring 161 to push the spring end 153 of the plunger 149 away from the fluid modulator manifold 135. Consequently, the sealing end 155 of the plunger moves away from the fluid exchange valve 129. Thus, the fluid pathway between the interior chamber 109 of the compression chamber 108 and the collection chamber 110 can be selectively opened or closed when the handle 125 is rotated to adjust the rate of fluid flow into the collection chamber. In some embodiments, the fluid pressure from within the interior chamber 109 helps the expansion spring 161 move the plunger 149 against the compression spring 157 and away from the fluid exchange valve 129 to open a fluid pathway into the collection chamber 110 through the exit pathway 145. In such embodiments, the handle 125 can be selectively rotated in the first direction and the second direction such that the fluid flow out of the interior chamber 109 of the compression chamber 108 matches the fluid flow into the interior chamber. When this occurs, the fluid pressure within the interior chamber 109 remains substantially constant while fluid is vented into the collection chamber 110.

As shown in FIG. 5, the collection chamber 110 is mounted to the flow modulator assembly 124 at the fluid exchange valve 129, which is surrounded by a collar 131 forming an annular gap 167. At least one exhaust pathway 165 is formed in the fluid exchange valve 129. The exhaust pathways 165 allow fluid to exhaust from the collection chamber 110 and out through the annular gap 167 formed in the collar 131 once the liquid extracted from the solid matrix within the compression chamber 108 has precipitated and collected in the collection chamber 110.

The illustrated embodiment shows a flow modulator assembly 124 with a handle 125 that is manually turned to open or close the fluid pathway between the compression chamber 108 and the collection chamber 110. It is contemplated, however, that alternative embodiments can include a flow modulator assembly that automatically opens and closes in response to predetermined circumstances, such as the value of the pressure in the compression chamber or a command signal from an operator.

Referring again to FIG. 2, the system further includes a temperature controller 248 mounted on the housing 102. The controller 248 includes a display screen that is visible on the exterior of the portable SFE system 100. In some embodiments, the temperature controller 248 includes input buttons (not shown) accessible from the exterior of the housing 102. The temperature controller 248 electrically communicates with at least one thermocouple (not shown) via wires 250, and at least one heating element (not shown) mounted within the heating block 114. The temperature controller 248 is adapted to cause the heating elements within the heating block 114 to heat the compression chamber 108 to a predetermined, desired temperature. The thermocouples in the heating block 114 are configured to monitor the temperature of the compression chamber 108 and provide a temperature signal to the controller 248 indicative of a compression chamber temperature. The temperature controller 248 operates to monitor the temperature signal and control the heating elements to maintain the desired compression chamber temperature. It should be understood that other mechanisms of measuring and controlling the temperature of the compression chamber 108 can be used.

Using the input buttons on the temperature controller 248, a user can set a maximum and/or a minimum desired temperature for the compression chamber 108. When the temperature of the compression chamber 108 is sensed to be below the minimum temperature, the temperature controller 248 causes the heating elements to activate and heat the compression chamber. When the temperature of the compression chamber 108 is sensed to exceed the maximum temperature, the temperature controller 248 ceases activation of the heating elements to allow the compression chamber to either cool down or maintain its temperature. Alternatively, a user may set a single desired temperature, to which the controller will maintain the chamber. In such operations, the controller may use a feedback-control system based on the temperature signals provided by the thermocouples. The display screen on the temperature controller 248 displays to a user the current temperature of the compression chamber 108, the minimum desired temperature, the maximum desired temperature, a desired temperature, and the like.

Some embodiments of the portable SFE system 100 may also include a fan 252 mounted to the housing 102. The fan 252 operates to cool the interior of the housing when the portable SFE system 100 is running. The fan 252 may be operated continuously or based on a sensed temperature of various components, for example, the pistons. In some embodiments, when the temperature controller 248 determines via the thermocouples that the temperature of the compression chamber 108 has exceeded a predetermined temperature, the temperature controller 248 can instruct the fan 252 to turn on to help cool the fluid running through the system 100. When the temperature controller 248 determines that temperature of the compression chamber 108 has fallen below a predetermined temperature, the temperature controller can instruct the fan 252 to stop running.

INDUSTRIAL APPLICABILITY

The portable SFE system 100 can be used to extract liquid from a solid matrix, such as plant material. The solid matrix is disposed within an interior chamber 109 of the compression chamber 108. Although many suitable fluids can be used with the disclosed system, by way of example and not limitation, carbon dioxide ($CO_2$) is used in some embodiments. In such embodiments, $CO_2$ is introduced into the system at the input orifice 112 from a $CO_2$ storage tank or other $CO_2$ source at a relatively low pressure. In certain embodiments, $CO_2$ enters the input orifice 112 at about 800 pounds per square inch (psi), but other $CO_2$ input pressures are contemplated. Referring to FIGS. 3-4, the $CO_2$ enters through the input orifice 112 and into the first inlet pathway 187. In embodiments featuring two piston assemblies, such as illustrated herein, the first inlet pathway 187 splits the $CO_2$ into two streams. A first $CO_2$ stream 260 flows into the inlet transfer line 216, and a second $CO_2$ stream 262 flows toward the fluid inlet 166 of the first piston assembly 156. The first $CO_2$ stream 260 flows through the transfer line 216, into the second inlet pathway 218, and toward the fluid inlet 208 of the second piston assembly 158. In some embodiments, it is contemplated that no transfer line is used and that, instead, the second inlet pathway is formed in the intake manifold in direct fluid communication with the first inlet pathway and the input orifice. As shown in FIG. 4, when the end 163, 205 of the pistons 162, 204 is retracted to a position that exposes the fluid inlets 166, 208 to the chamber 179, 216, the vacuum formed by the retracting piston helps pull the first and second streams of $CO_2$ 260, 262 into the respective chambers 179, 216.

When the pistons 162, 204 move toward the ends 181, 217 of the piston housings 160, 202, as shown in FIG. 3, the pistons compress the first and second $CO_2$ streams 260, 262 within the respective chambers 179, 216. Once the pressure within the chambers 179, 216 reaches a predetermined output pressure level, the force from the pressurized $CO_2$ will exceed the resistive force of the springs 190, 230 combined with the resistive force of the pressurized $CO_2$ downstream from the chambers, causing the respective valves 164, 206 to open. In certain embodiments, the predetermined output pressure level that causes the valves 164, 206 to open can be at least about 1200 psi, but other output pressures are contemplated. When the valves 164, 206 are open, the first and second $CO_2$ streams, now at the output pressure, flow through the valves 164, 206 and into the first exit fluid line 176 and the second exit fluid line 214, respectively. Both $CO_2$ streams 260, 262 flow into the exit line junction 196, where they combine into a single, relatively high pressure $CO_2$ stream 264 and flow into the combined exit fluid line 236. The high pressure $CO_2$ flows through the combined exit fluid line 236 and into the output pathway 240, where the pressure regulator 242 is adapted to measure the pressure of the high pressure $CO_2$ stream 264. The high pressure $CO_2$ stream then flows out of the output pathway 240 and into the output fluid line 238.

Figure 6:
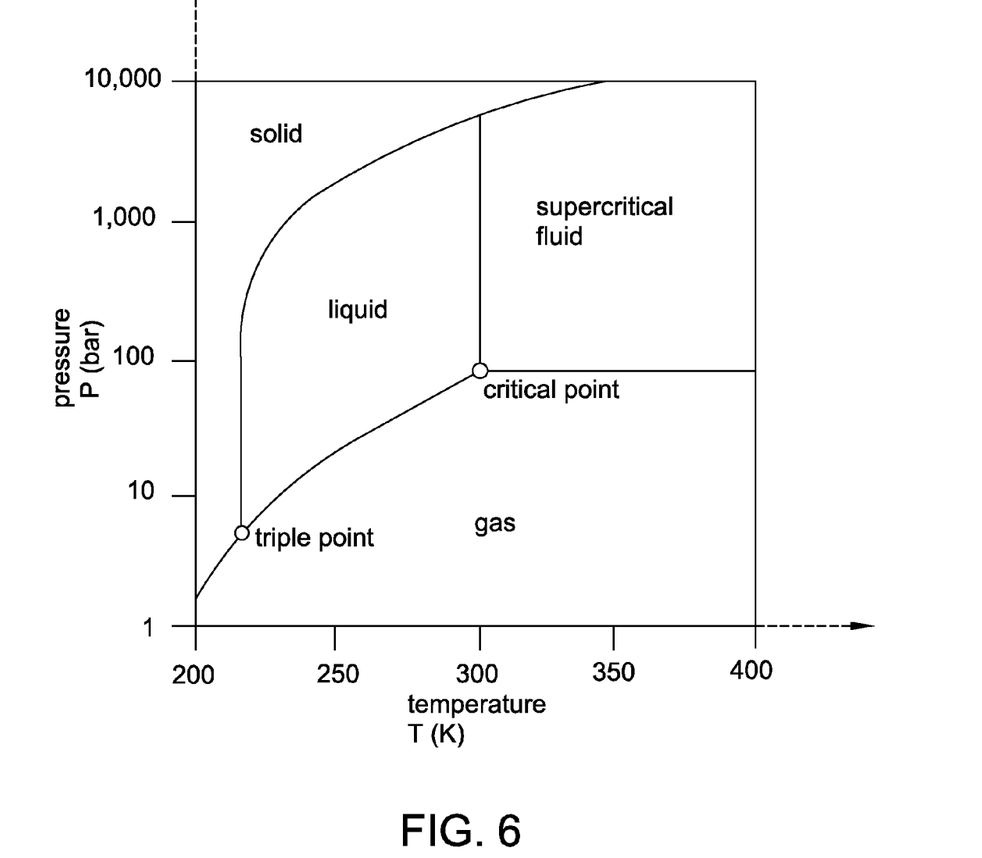
FIG. 6 is a carbon dioxide phase diagram.

Referring now to FIG. 2, the high pressure $CO_2$, denoted as 264, flows along the single-pass fluid path from the output fluid line 238, through the compression manifold 116, through the high pressure hose 120, through the end fitting 122, and into the interior chamber 109 (shown in FIG. 5) of the compression chamber 108. In the compression chamber 108, the high pressure $CO_2$ 262 assumes a supercritical state based on its then present pressure and temperature. FIG. 6 illustrates a phase diagram of carbon dioxide. As shown, $CO_2$ becomes a supercritical fluid at a pressure and temperature combination that is at least about 73.8 bar (1,070 psi) and at least about 300 K (80.3 degrees F.). Referring now to FIG. 5, the supercritical $CO_2$ mixes with the solid material, for example, plant material, disposed within the internal chamber 109 of the compression chamber 108. The supercritical $CO_2$ acts as a solvent and extract liquids from the plant or other solid material. The saturated $CO_2$ stream 266 flows out of the interior chamber 109 and into the modulator pathway 143.

When a user would like to collect fluid extracted from the plant material, the user turns the handle 125 of the flow modulator assembly 124 to open the fluid pathway between the modulator pathway 143 and the collection chamber 110 via the exit pathway 145. The saturated $CO_2$ stream 266 is at a relatively high pressure compared to the pressure within the collection chamber 110. Thus, when the user turns the handle 125 to move the handle upward, the expansion spring 157 and the $CO_2$ stream work to open the flow modulator 124, and the saturated $CO_2$ stream 266 flows out of the compression chamber 108 and into the collection chamber 110. The temperature and pressure within the collection chamber 110 is lower than that required for the fluid, e.g. $CO_2$, to be a supercritical fluid. For example, in some embodiments, the collection chamber 110 is at or near atmospheric pressure. Therefore, as the saturated $CO_2$ stream 266 enters the collection chamber 110, the $CO_2$ transitions into the gas phase, allowing extracted liquid 268, which was previously in solution within $CO_2$, to condense and collect in the collection chamber. Exhaust streams 270 of gaseous $CO_2$ escape the collection chamber 110 through the exhaust pathways 165 in the fluid exchange valve 129 and further out through the annular gap 167 formed around the collar 131, leaving only the extracted liquid 268 within the collection chamber. In some embodiments, the user can adjust the handle 125 position to allow the expansion spring 157 and the saturated $CO_2$ stream to push the plunger 149 away from the valve seat 139 to allow saturated $CO_2$ flow into the collection chamber 110. The user can monitor the pressure within the interior chamber 109 using the pressure gauge 118, and adjust the range of $CO_2$ flow through the exit pathway 145 by selectively turning the handle 125. In some embodiments, the user can use the handle 125 to adjust the $CO_2$ flow exiting the interior chamber 109 of the compression chamber 108 to substantially match the $CO_2$ flow into the interior chamber. In such embodiments, the $CO_2$ pressure within the interior chamber 109 will remain substantially constant, allowing for consistent liquid extraction as long as compression continues. When the desired amount of extracted liquid 268 has been collected in the collection chamber 110, the user can turn the handle 125 to close the flow modulator assembly 124 and close the fluid pathway between the compression chamber 108 and the collection chamber 110.

In the illustrated embodiment, $CO_2$ enters the portable SFE system 100 at the input orifice 112, exits the system through the fluid exchange valve 129, and is released into the atmosphere without being recycled. In such embodiments, fresh $CO_2$ or other fluid is regularly introduced into the system 100. It is contemplated that, in some embodiments, the gaseous $CO_2$ exhausted from the fluid exchange valve 129 is recaptured and recycled back into the system 100. One benefit of introducing fresh fluid into the system instead of recycled fluid is that recycled fluid can mix with water or other vapors, which can affect the quality and purity of the extracts. Introducing fresh fluid into the system 100 can help alleviate such effects.

Figure 7:
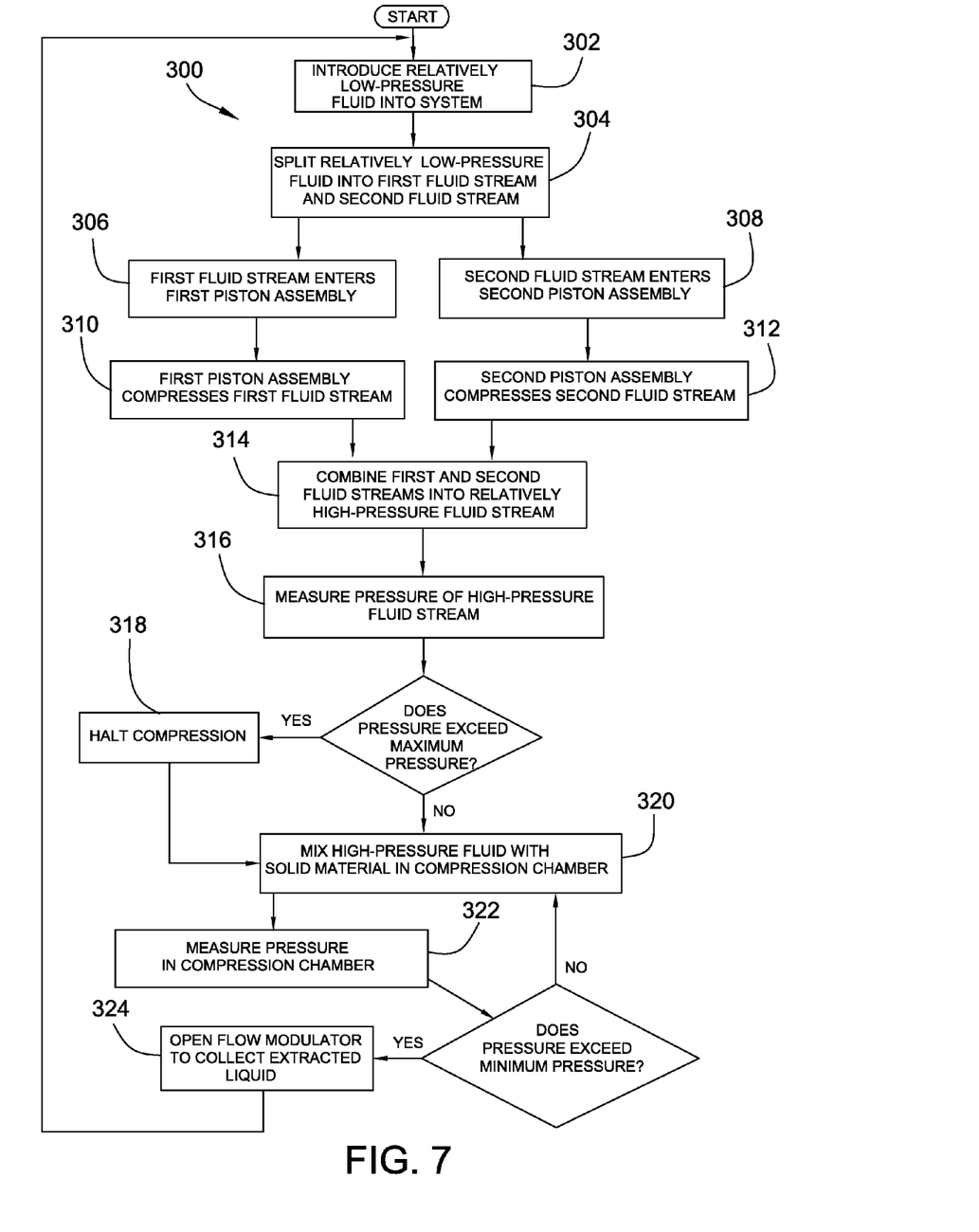
FIG. 7 is a flow chart depicting an exemplary method of operating the portable supercritical fluid system of FIG. 1.

FIG. 7 illustrates an exemplary method 300 for operating the portable SFE system 100. At 302, fluid at a first, relatively low pressure, is introduced into the system at an input orifice. At 304, the low-pressure fluid splits into a first fluid stream and a second fluid stream. At 306, the first fluid flows into a first piston assembly, and at 308, the second fluid stream flows into a second piston assembly. At 310, the first piston assembly compresses the first fluid stream and, at 312, the second piston assembly compresses the second fluid stream. At 314, the compressed first fluid stream and the compressed second fluid stream combine to form a high-pressure fluid stream, which is disposed at a second, higher pressure. The high-pressure fluid stream then follows a single-pass fluid path that fluidly extends from the piston assemblies, through the compression chamber where solid material is disposed, and into a collection chamber. At 316, a pressure regulator measures the pressure of the high-pressure fluid stream. At 318, if the high-pressure fluid stream exceeds a predetermined maximum pressure, the pressure regulator will halt compression. At 320, the high-pressure fluid mixes with a solid material in a compression chamber. At 322, the pressure within the compression chamber is measured. If the pressure within the compression chamber exceeds a minimum pressure, a flow modulator is opened to allow collection of the extracted liquid at 324. The liquid extracted from the solid material in the compression chamber will precipitate out of the high-pressure fluid stream when the high-pressure fluid stream is exposed to a pressure in the collection chamber below the minimum pressure. In certain embodiments, the minimum pressure is in a range between about 1,000 psi and about 1,200 psi, or about 1,070 psi in some embodiments. In some embodiments, both temperature and pressure within the compression chamber is measured, and the flow modulator is opened to allow collection of extracted liquid if both the temperature and pressure exceed a minimum temperature and a minimum pressure, or a combination of the two.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A supercritical fluid extraction system, comprising:
   a housing;
   a motor mounted to the housing;
   a linkage assembly disposed within the housing and moveable by the motor;
   a carriage coupled to the linkage assembly such that the carriage moves when the motor moves the linkage assembly;
   a piston assembly disposed within the housing, the piston assembly including:
      a piston body having a first end and a second end;
      a chamber formed within the piston body between the first end and the second end;
      a back check valve disposed at the first end;
      a piston coupled to the carriage and movably disposed partially within the second end of the piston body, the piston adapted to move within the chamber alternatively toward and away from the back check valve when the carriage moves; and
      a fluid inlet formed in the piston body, the fluid inlet disposed such that movement of the piston within the chamber selectively opens and closes fluid communication between the fluid inlet and the chamber;
      wherein the piston assembly is adapted to receive a fluid at a relatively low pressure through the fluid inlet, compress the fluid within the chamber with the piston, and expel the fluid through the back check valve at a relatively high pressure into an exit fluid line;
   an intake manifold mounted to the housing, the intake manifold adapted to receive fluid through an input orifice and to provide an inlet pathway between the input orifice and the fluid inlet of the piston assembly;
   a compression chamber mounted to the housing, the compression chamber adapted to contain solid material for liquid extraction, wherein the compression chamber is in fluid communication with the exit fluid line such that the relatively high-pressure fluid expelled from the piston assembly enters the compression chamber;
   a collection chamber in selective fluid communication with the compression chamber; and
   a flow modulator assembly adapted to open and close to selectively provide fluid communication between the compression chamber and the collection chamber;
   wherein the fluid within the collection chamber creates a supercritical condition within the collection chamber and thus causes an extraction of liquid from the solid material when the pressure of fluid reaches a minimum pressure, and the fluid precipitates the extracted liquid into the collection chamber when the fluid and the liquid exit through the flow modulator assembly when the flow modulator assembly is opened such that the pressure of the fluid drops below the minimum pressure within the collection chamber; and
   wherein a single-pass flow path for high-pressure fluid fluidly connects the exit fluid line and the collection chamber, the single-pass flow path extending from the exit fluid line, through the compression chamber, through the flow modulator assembly, and into the collection chamber.

2. The supercritical fluid extraction system of claim 1 further comprising:
   a second piston assembly comprising:
      a second piston body having a first end and a second end;
      a second chamber formed within the second piston body between the first end and the second end;
      a second back check valve disposed at the first end of the second piston body;
      a second piston coupled to the carriage and movably disposed partially within the second end of the second piston body, the second piston adapted to move within the second chamber alternatively toward and away from the second back check valve when the carriage moves; and
      a second fluid inlet formed in the second piston body, the second fluid inlet disposed such that movement of the second piston within the second chamber selectively opens and closes fluid communication between the second fluid inlet and the second chamber;
      wherein the second piston assembly is adapted to receive fluid at a relatively low pressure though the second fluid inlet, compress the fluid within the second chamber with the second piston, and expel the fluid through the second back check valve at a relatively high pressure into a second exit fluid line.

3. The supercritical fluid extraction system of claim 2, wherein the intake manifold is further adapted to provide a second inlet pathway between the input orifice and the second fluid inlet of the second piston assembly.

4. The supercritical fluid extraction system of claim 2 further comprising an inlet transfer line providing fluid communication between the inlet pathway and the second inlet pathway.

5. The supercritical fluid extraction system of claim 2, wherein the exit fluid line combines with the second exit fluid line to form a combined exit fluid line in fluid communication with the compression chamber, and wherein the single-pass flow path further extends through the combined exit fluid line.

6. The supercritical fluid extraction system of claim 5 further comprising a pressure regulator in fluid communication with the combined exit fluid line and in electronic communication with the motor, wherein the pressure regulator is adapted to sense the pressure of the fluid within the combined exit fluid line and send a signal to the motor to shut off when the pressure within the combined exit fluid line exceeds a maximum pressure.

7. The supercritical fluid extraction system of claim 1 further comprising a heating block mounted to the housing adjacent the compression chamber, the heating block adapted to maintain a predetermined temperature within the compression chamber.

8. The supercritical fluid extraction system of claim 7 further comprising a temperature controller adapted to receive a temperature signal from a temperature sensor within the heating block and to send signals to a heating element within the heating block, wherein the temperature controller is configured to monitor the temperature signal and control the heating element to maintain a desired temperature of the compression chamber.

9. The supercritical fluid extraction system of claim 1, wherein the fluid is carbon dioxide.

10. The supercritical fluid extraction system of claim 9, wherein the minimum pressure is in a range between about 1,000 psi and about 1,200 psi.

11. The supercritical fluid extraction system of claim 1, wherein the solid material within the compression chamber is plant material.

12. A supercritical fluid extraction system comprising:
a housing;
a motor mounted to the housing;
a linkage assembly disposed within the housing and moveable by the motor;
a carriage coupled to the linkage assembly such that the carriage moves when the motor moves the linkage assembly;
a first piston assembly disposed within the housing, the first piston assembly adapted to:
  receive fluid through a first fluid inlet at a relatively low pressure;
  compress fluid within the first piston assembly; and
  expel fluid at a relatively high pressure into a first exit fluid line;
a second piston assembly disposed within the housing, the second piston assembly adapted to:
  receive fluid through a second fluid inlet at a relatively low pressure;
  compress fluid within the second piston assembly; and
  expel fluid at a relatively high pressure into a second exit fluid line;
an intake manifold mounted to the housing, the intake manifold comprising:
  an input orifice adapted to receive fluid;
  a first inlet pathway formed in the intake manifold that provides a fluid connection between the input orifice and the first fluid inlet of the first piston assembly and a fluid connection between the input orifice and an inlet transfer line; and
  a second inlet pathway formed in the intake manifold that provides a fluid connection between the inlet transfer line and the second fluid inlet of the second piston assembly;
a compression chamber mounted to the housing, the compression chamber adapted to contain solid material for liquid extraction, wherein the compression chamber is in fluid communication with both the first and second exit fluid lines such that the fluid expelled from the first and second piston assemblies enters the compression chamber;
a collection chamber in selective fluid communication with the compression chamber; and
a flow modulator assembly adapted to open and close to selectively provide fluid communication between the compression chamber and the collection chamber;
wherein the fluid within the collection chamber creates a supercritical condition within the collection chamber and thus causes an extraction of liquid from the solid material when the pressure of fluid reaches a minimum pressure, and the fluid precipitates the extracted liquid into the collection chamber when the fluid and the liquid exit through the flow modulator assembly when the flow modulator assembly is opened such that the pressure of the fluid drops below the minimum pressure within the collection chamber; and
wherein a single-pass flow path for high pressure fluid is defined and extends from the first and second exit fluid lines, through the compression chamber, through the flow modulator assembly, and into the collection chamber.

13. The supercritical extraction system of claim 12, further comprising:
a combined exit fluid line that provides a fluid pathway between both the first and second fluid exit lines and an output pathway formed in the intake manifold, wherein the combined exit fluid line is part of the single-pass flow path; and
a pressure regulator in fluid communication with the output pathway and in electronic communication with the motor, wherein the pressure regulator is adapted to sense the pressure of the fluid within the output pathway and send a signal to the motor to shut on when the pressure within the combined exit fluid line exceeds a maximum pressure.

14. The supercritical extraction system of claim 12, wherein the fluid is carbon dioxide.

* * * * *

UNITED STATES PATENT AND TRADEMARK OFFICE
CERTIFICATE OF CORRECTION

Page 1 of 1

PATENT NO.       : 9,528,660 B2
APPLICATION NO.  : 14/096607
DATED            : December 27, 2016
INVENTOR(S)      : Kotsiopoulos It is certified that error appears in the above-identified patent and that said Letters Patent is hereby corrected as shown below:

In the Claims

Claim 1, Column 15, Line 34, "manifbld" should read "manifold"

Claim 13, Column 18, Line 34, "on" should read "off"

Signed and Sealed this
Eighteenth Day of April, 2017

Michelle K. Lee
*Director of the United States Patent and Trademark Office*